Figure 1:
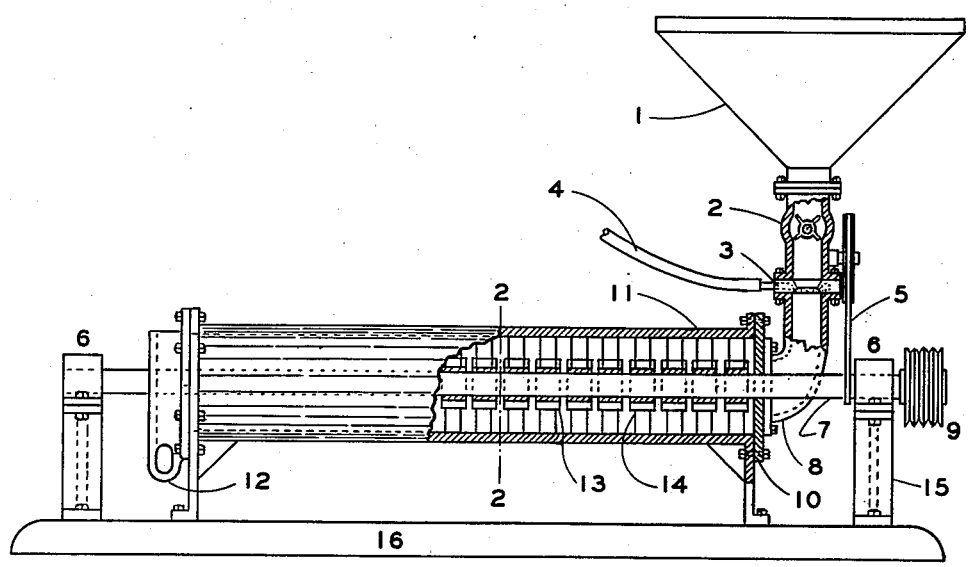

June 16, 1936.  M. F. CROSS  2,044,757

METHOD OF DISPERSING PARTICLES AND APPARATUS THEREFOR

Filed March 11, 1936

INVENTOR.

Matthew Forbes Cross

BY

ATTORNEY.

Patented June 16, 1936

2,044,757

UNITED STATES PATENT OFFICE 2,044,757

METHOD OF DISPERSING PARTICLES AND APPARATUS THEREFOR

Matthew Forbes Cross, Kansas City, Mo.

Application March 11, 1936, Serial No. 68,282

10 Claims. (Cl. 83—13)

This invention relates to an improved method and means of dispersing conglomerates of macroscopic, microscopic and colloidal particles either solid or liquid in the presence of a fluid medium. It provides, among other things A means for producing a stable suspension or emulsion of solid or liquid particles in a fluid medium, A means of dispersing particles of conglomerates in a liquid menstruum, A means of disintegrating conglomerates of solid particles to their natural ultimate sizes and of wetting the surface of each particle, A means of disintegrating conglomerates that do not readily disintegrate with water alone by ordinary agitation, A means of uniformly dispersing or homogenizing mixtures of substances of dissimilar nature to produce stable suspensions, emulsions or colloidal mixtures, A means of disintegrating granular, cellular or fibrous conglomerates without rupturing the grain, cell, fiber or particles themselves, A means of intimately contacting particles with fluids or chemicals to attain rapid solution or reaction, A means of increasing the viscosity of heterogeneous fluid mixtures such as clay suspensions by wetting the surface of each ultimate particle, A means of overcoming segregation in stratified or heterogeneous fluid mixtures and for other purposes as will become apparent from a reading of the following specification in the light of the accompanying drawing.

More specifically, the means provided is that of causing a surface of tough rubber or other tough rubber-like or flexible material to spread the mixture with a wiping pressure, in an extremely thin film on a stationary surface of the kind and in the manner hereinafter described. The pressure of the rubber is produced by centrifugal action or by spring action, the rubber being weighted in addition to its own normal weight, if desired or necessary. The yielding surface of the rubber obviates the danger of obstruction, wear or even breakage which occurs if an attempt is made to pass particles through a fixed opening such as is used in the ordinary dispersion or colloid mill. By the method of this invention, the effect of the ordinary dispersion or colloid mill is obtained as well as the distintegrating action due to the attrition of the flexible wipers on a hard and smooth surface.

Among the main objects of this invention is the provision of an improved process and apparatus for the production of colloidal mixtures, suspensions, emulsions, pastes, ointments, and in general, the dispersion of all types of heterogeneous fluid mixtures. Specific examples of the application of this process are: the manufacture of oil well drilling muds; the suspension of sulphur and clay in water; manufacture of paints and calcimines; the making of emulsions of asphalt, clay and water, or asphalt soap and water for road, sidewalks and roofing work; the manufacture of medicinal oils in emulsion form; the manufacture of vegetable food mixtures; the pulping of vegetables; manufacture of insecticidal sprays and many other uses which are apparent from the character of the process.

The efficiency of this process to disintegrate conglomerates is shown in the disintegration of fuller's earth or clay such as is produced by the Floridin Company, at Quincy, Florida. This fuller's earth or clay which is zeolitic in type, when mixed in the proportion of four parts in 96 parts of water and thoroughly shaken and stirred by an ordinary agitator, yields a mixture with a viscosity of about 3 centipoises; when the same mixture is agitated with a high speed blade stirrer, the viscosity may be increased to as much as 19. When mixed in accordance with the process herein described and with the apparatus herein described, the viscosity of the same mixture is increased to above 40 and when placed in a colloid mill of the usual type, the viscosity is not materially increased.

It will accordingly be seen that by this improved process the dispersion is essentially as effective as in a colloid mill which forces all particles through restricted openings. Furthermore, in the ordinary colloid mill particles must, before being introduced into the mill, be reduced in size to the size of the openings in the mill itself, whereas in the present apparatus and process the particles are reduced in size and are dispersed in a single operation. Thus a single operation replaces two separate steps of the prior art and a single piece of apparatus takes the place of two, with the consequent saving of time and money.

Figure 2:
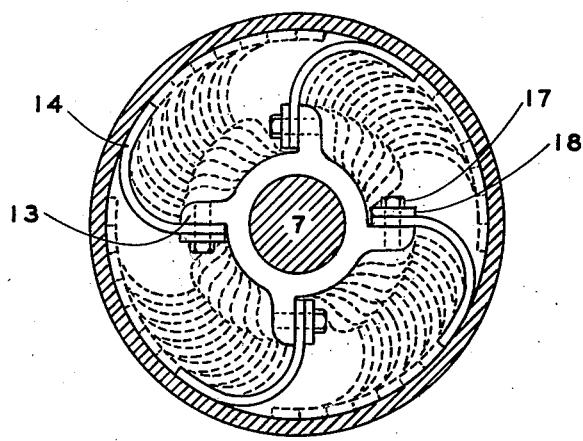

Referring now to the drawing, in which there is described an illustrative embodiment or form of apparatus for carrying out the method, Figure 1 is a front elevational view with certain parts broken away in order to show more clearly the internal arrangement of the apparatus and, Figure 2 is a view, in section, taken along the line 2—2 of Figure 1, dotted lines being employed to show more clearly the location of certain parts.

As illustrated, the reference numeral 1 indicates a hopper or bin, the flow from which is controlled by means of any suitable device, such, for example, as a rotary feeder or a valve 2. Located beneath the valve and within the passageway leading from the hopper is an annular spray ring 3 having a hose connection 4, the purpose of which will hereinafter be more fully described. Located at the lower extremity of the feed passageway is a cylindrical shell having a rotary shaft extending therethrough. As shown, the shaft is designated by the reference numeral 7 and is mounted for rotation in bearings 6, 6. One extremity of the shaft is provided with a pulley 9 for connection with any suitable source of power, and a belt 5 extends from the shaft for the purpose of driving the rotary feed device or impeller 2. The lower extremity of the feed passage is curved as indicated in 8 to form a charging chute having communication with the interior of the shell 11. An end closure or casing 10 is secured to the shell in any suitable manner and serves to close the latter except for openings formed therein for the reception of the shaft 7 and the changing chute 8. Located at the opposite extremity of the horizontal cylinder is a discharge chute or opening 12 from which are discharged materials fed from the hopper. Positioned within the shell and secured to the shaft are a series of spider blocks 13 having resilient wipers secured thereto. These wipers may be made of rubber, composition as in rubber belting, part metal and part rubber, weighted rubber, fiber, leather, or any other tough but yielding material. Continuing, the reference numeral 15 indicates a stand for the bearing 6, and 16 a base of any suitable character.

Figure 2 illustrates the rubber wiper which is here shown as a uniform piece of heavy rubber but may be of many desired designs to provide for the feature of centrifugal pressure. Numeral 13 indicates the spider to which the rubber wipers are attached in such a manner as to allow ample surface contact between the wiper and inside wall of the shell, while 17 is a cap screw for attaching the wiper. A washer 18 is provided for preventing loosening of the wipers. The shaft 7 may be solid or hollow dependent upon the size necessary to get the proper contact of the wipers.

In using this apparatus to carry out the process of the invention, there is placed in the hopper 1, the solid conglomerate material which is to be dispersed into the liquid. The hose 4 is connected to the source of liquid material within which the solid material is to be dispersed, suspended, emulsified or the like. If more than one liquid material is used, then additional spray rings, each with its own hose, may be inserted adjoining the ring 3 shown. The liquid is proportioned by a suitable pump, not shown, which introduces the fluid through the hose 4. The solid conglomerates are proportioned by adjustment of the rotary feeder 2 which is operated by means of the feeder belt 5 attached to the shaft 7, which in turn is operated by a belt attached to the pulley 9 from a power source not shown. Typical operating speeds are 500-1800 R. P. M. When the operation is ready to start, power is applied to pulley 9, the delivery of liquid through 4 is started and the conglomerate solids together with the liquid are fed into the shell of the mill 11. The discharge chute 12 is left open and the materials are fed into the shell at such a rate that the inner shell of the mixer is well covered with fluid. Ordinarily, this depth is not over ½ inch. The rubber wipers are so staggered as is apparent from Figure 2 that there is a constant forward movement of the mixture. This adjustment may be changed in accordance with the requirements of the material by changing the position of the wiper spiders which are held onto the shaft by set screws or keys. The rate of feeding is also governed by the character of the material discharged at 12. The rate of feeding, however, is the maximum that will produce the desired effect. If it is desired to operate intermittently or by batch, then chute 12 may be closed with a valve not shown in the drawing. When a mixture of solid conglomerates is to be used, then they may be premixed before placing in the hopper 1 or a Y pipe interposed between 2 and 3 and two feeders running at different speeds used instead of one. When emulsions are to be produced, then another spray ring should be inserted for each heterogeneous fluid. When an emulsion of asphalt and water is to be made, for example using zeolite, bentonite or clay, then the asphalt is heated to a temperature sufficient to cause it to flow readily, the water is added hot in a separate spray ring and the clay is fed in constantly. In cases where oil or hot asphalt tends to attack the rubber, the rubber may be substituted with more resistant flexible material such as thiokol. In those cases where it is necessary to maintain the mixture hot, then the shell 11 may be jacketed for steam or hot gases.

It is to be appreciated that the invention is not restricted to the particular embodiment shown in the drawing, which is for purposes of illustration only, and that various modifications and rearrangements may be made without departing from the true scope of the invention as set forth in the appended claims.

I claim:

1. That improvement in methods of dispersing conglomerates of colloidal particles, which comprises mixing the conglomerates with a liquid, introducing the mixture into a closed, smooth cylindrical area, applying centrifugal pressure to the mixture to form a film and simultaneously applying resilient pressure to the exposed surface of the film in order to disintegrate the conglomerates and disperse the disintegrated particles throughout the mixture.

2. That improvement in methods of treating fluid mixtures containing solid particles of small size, which comprises applying centrifugal pressure to the fluid to form a film of substantially uniform thickness on a smooth surface and simultaneously subjecting the exposed surface of the film to a resilient pressure applied progressively and repeatedly across the face thereof.

3. That improvement in methods of distributing particles of small size in liquids, by dispersion, emulsion, wetting, or the like which comprises applying centrifugal pressure to the liquid to form a hollow cylindrical film on a smooth surface, said film being composed of the liquid and the particles, and simultaneously subjecting an exposed surface of said film to a resilient mechanical pressure treatment comprising a combined rubbing and dragging action.

4. That improvement in methods of dispersing conglomerates of colloidal particles which consists in imparting a circulatory movement of an admixture of liquid and conglomerates and simultaneously and repeatedly subjecting the conglomerates during such circulation to centrifugal pressure against a smooth surface and a mechanical treatment comprising a continuously repeated resilient rubbing and dragging action.

5. That improvement in methods of dispersing conglomerates of colloidal particles, which comprises mixing the conglomerates with a liquid, introducing the mixture into a closed, smooth cylindrical area, applying centrifugal pressure to the mixture to form a cylindrical film and simultaneously applying resilient pressure to the liquid whereby the conglomerates are disintegrated and the disintegrated particles are dispersed throughout the mixture, said pressure being applied in such a manner that the fluid mixture forming the film is caused to progress lengthwise of the cylindrical area.

6. An apparatus of the character described, comprising, in combination, a closed shell having a substantially smooth interior surface, means for feeding material to the shell, a rotary shaft extending within the shell, and a flexible, unitary, resilient member having one extremity connected with the shaft in spaced relationship with the interior surface of the shell at a point relatively distant therefrom and the opposite extremity arranged to lie flat on the interior surface of the shell.

7. An apparatus of the character described comprising in combination a closed cylindrical shell having a substantially smooth interior surface, means for feeding material to the shell, a rotary shaft extending centrally throughout the shell, and a plurality of flexible, unitary, resilient members mounted upon the shaft and adapted to rotate therewith, each of said members having one extremity secured to the shaft in spaced relationship with the interior surface of the shell at a point relatively distant therefrom and the opposite extremity arranged to lie flat on the interior surface of the shell.

8. An apparatus of the character described, comprising, in combination, a closed cylindrical shell, means for feeding the material to the shell, a rotary shaft extending centrally throughout the shell, and a plurality of flexible members mounted upon the shaft and adapted to rotate therewith and exert pressure on the interior surface of said shell, said flexible members being staggered to form a helix the axis of which extends in the direction of the longitudinal axis of the shaft whereby the material is caused by said members to move lengthwise of said shell.

9. An apparatus of the character described, comprising, in combination, a closed cylindrical shell having a substantially smooth interior surface, a rotary shaft mounted centrally of the shell, a plurality of spiders secured to the shaft and adapted to rotate therewith, and a plurality of wiper members extending outwardly from each spider and being secured thereto at a point relatively distant from the interior surface of the shell and adapted to lie flat on the interior face of the shell.

10. An apparatus of the character described, comprising, in combination, a closed cylindrical shell having a substantially smooth interior surface, means for feeding material to the shell, a rotary shaft extending centrally throughout the shell, a plurality of flexible, unitary, resilient members mounted upon the shaft in spaced relationship with the interior surface of the shell at a point relatively distant therefrom and in such a manner that their extremities lie flat against the shell, and means for rotating the shaft at a speed of from 500 R. P. M. to 1800 R. P. M.

MATTHEW FORBES CROSS.